US005790477A

United States Patent [19]

Hauke

[11] Patent Number: 5,790,477
[45] Date of Patent: Aug. 4, 1998

[54] PORTABLE PRECISION CLOCK WITH ADDITONAL FUNCTIONS

[75] Inventor: Rudolf Hauke, Niederstotzingen, Germany

[73] Assignee: Asulab S.A., Bienne, Switzerland

[21] Appl. No.: 871,885

[22] Filed: Jun. 9, 1997

[51] Int. Cl.[6] .................... G04B 47/00; G04C 11/00
[52] U.S. Cl. ...................... 368/10; 368/11; 368/368; 368/47
[58] Field of Search .................. 368/10, 11, 46, 368/47; 33/271, 355; 342/357, 387, 457

[56] References Cited

U.S. PATENT DOCUMENTS 5,319,374  6/1994  Desai et al. ................... 342/387
5,521,887  5/1996  Loomis .......................... 368/47
5,550,794  8/1996  Born et al. ..................... 368/11

Primary Examiner—Vit W. Miska
Attorney, Agent, or Firm—Griffin, Butler Whisenhunt & Szipl

[57] ABSTRACT

The portable precision watch, additionally to time-keeping functions, also comprises a GPS receiver with antenna, evaluation electronics, a compass, a destination coordinate memory, an input element and a display element. With the evaluation electronics the coordinates of the location and the direction to the destination are computed and are made directly viewable as a vector display in the display element. Thus a very compact precision watch is provided which may be personally carried everywhere and worldwide, and directly displays the direction to any destination, in particular as a pocket watch or wrist watch.

22 Claims, 6 Drawing Sheets

PORTABLE PRECISION CLOCK WITH ADDITONAL FUNCTIONS

BACKGROUND OF THE INVENTION

The invention relates to a portable precision watch with additional functions, according to the earlier part of claim 1, the watch being very compact and because of this, always available and able to be personally carried about, in particular the invention relates to pocket watches and wrist watches. Compact pocket watches and wrist watches with functions of various types are known: with chronograph watch functions such as stop watches, alarms, world time clocks, and with additional functions such as a calculator, a data bank or even with functions such as temperature and weather displays.

On the one hand, precision watches e.g. radio watches or satellite watches are known e.g. as traveling alarms, wherein however a high cost for the precision time-keeping is required, while this only being at all possible in limited regions.

However, on the other hand, and completely different to this, there are known navigational systems, as ship installations and recently as navigational installations in motor vehicles, e.g. Autotravel from Bosch. These installations are however relatively large, complicated and expensive and consist of several separate components, wherein here the orientation functions are mainly based on stored maps and route determination software. This requires large memory and computational capabilities, as well as a corresponding considerable energy requirement. Further, portable GPS position finders are already known, which more or less make possible complicated navigational functions.

It is however still not possible in any way to achieve orientation functions with compact, personally carried precision watches, such as a pocket watch and in particular a wrist watch.

BRIEF SUMMARY OF THE INVENTION

It is therefore an object of the invention to provide a very compact precision watch, available everywhere and capable of being personally carried about, which additionally makes possible the orientation anywhere in unknown terrain, and to display, from any unknown location, the effective direction to a desired destination. This especially concerns wrist watches and pocket watches which can always be carried around by a person, e.g. in jacket pockets or in a ladies handbag. Moreover, this precision and orientation watch should be relatively inexpensive in comparison to large navigational installations and should have a minimal energy requirement.

This object is achieved by a precision watch according to present claim 1. With this, for the first time, a compact personal watch is provided which apart from exact precision watch functions, also makes possible orientation anywhere in the world with regard to every desired destination, and which may be carried about by the carrier.

The possibility of GPS position finding, or generally satellite position finding, is as a rule, used with the help of a map or a city plan in practice. The map must contain details of longitude and latitude. The geographical position of the location evaluated by the GPS receiver must be transmitted to the map before one can orientate oneself in the surroundings. With this, there results also the celestial directions as well as the direction to a destination, if this is likewise indicated on the map. One obtains a direct "analog" indication of the directions when one aligns the map towards the north. Maps for special regions in the meantime may also be electronically stored, and the individually measured position may be automatically superimposed.

At the same time there is the disadvantage that probably the most important and common question concerning orientation in a terrain, that is, the question of direction to a destination, cannot be answered with the GPS method alone without map information. The answer however is often not possible or not useful: this is when there is no map available or no geographical longitudes or latitudes are indicated, the region has not been recorded cartographically or there are no striking points present, recognizable or identifiable, as is often the case in open terrain, in forests, in the desert, on the open sea or with darkness.

In navigational installations, the combination of GPS measurement with compass information permits the computation and indication on the direction from any location to any destination when the destination coordinates are known. This object can be achieved by way of navigational installations, e.g. on ships. These installations however cannot be operated by everyone and above all of course, cannot always be carried.

With the precision watch according to the invention then, not only is an absolutely precise time measurement possible, but with a very simple and direct handling, able to be carried out by everyone, a direction finding is also possible in that a pointer-shaped display device, independent of the rotational position of the horizontally held watch, similar to a needle compass towards the north, points to the desired destination.

Particularly advantageous embodiment examples are: wrist watches, various combinations of display, antenna, operating element as well of the two functions precision time information and orientation information, and also "pocket watches", i.e. compact watches which are carried as a pocket watch, as a travel alarm or also, as with a stop watch, are carried around the neck, which can be easily brought along and which are also always carried about by the carrier.

The dependent claims relate to advantageous further forms of the invention with particularly compact, light-weight and energy saving designs, and element arrangements which permit further areas of application and orientation functions.

BRIEF DESCRIPTION OF THE DRAWINGS

The invention is hereinafter described in more detail by way of examples and drawings in which there are shown.

DETAILED DESCRIPTION OF THE INVENTION

Figure 1:
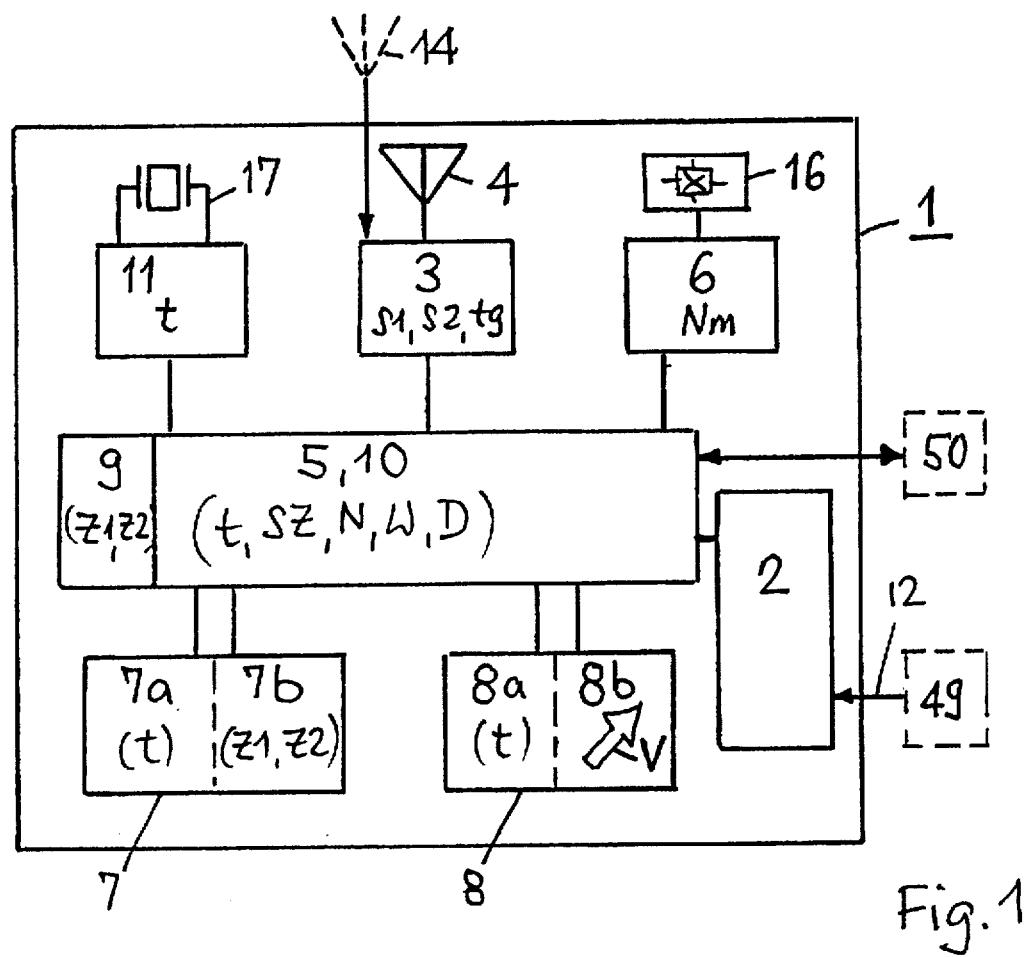
FIG. 1 schematically, the construction of the precision watch according to the invention with a vector destination direction display, FIG. 2 a highly integrated, particularly compact design, e.g. with a wrist watch.

FIG. 1 schematically shows a precision watch 1 according to the invention, which presents a combination of time keeping functions 11 with a watch crystal 17, a satellite navigation receiver, here as a Global Positioning System (GPS) receiver 3 with an antenna 4, and a compass 6 with magnetic field sensors 16 for determining the magnetic north-south direction Nm as well as with evaluation electronics 5. The input element 7 or 7b serves for inputting the coordinates of a selectable destination Z, Z1, Z2. These destinations can be stored in a memory 9 and can also be changed, for example in an EEPROM memory. By way of evaluation electronics 5, the coordinates of the location S, S1, S2 are determined and from the coordinates of the location and the coordinates of the destination Z, the direction SZ to the destination is calculated (see FIG. 3, 4). By way of the compass, the alignment of the watch or the angle W between the watch axis U and the geographical north direction is determined, wherein the geographical north direction N is determined from the measured magnetic north direction Nm by a correction corresponding to the magnetic declination of the determined location (by way of stored declination values). Subsequently, taking account of the alignment of the watch, the direction to the desired destination Z, Z1, Z2 is made viewable in a display element 8 or 8b as a vector display V, i.e. independent of the rotational position of the watch, the vector display V always points to the destination Z in the direction SZ. In the operating element 7 and the display element 8, the time-keeping functions are indicated at 8 or 8b and the orientation functions at 7b, 8b. All elements of this precision watch with orientation functions are grouped together as a compact functional unit and the computation of the data is effected in a microprocessor 10. The watch time t supplied by the watch crystal 17 is continuously controlled or corrected by the accurately received GPS time tg so that in the time-keeping display 7a a highly accurate time t is indicated. An energy supply 2 of the watch comprises a very high concentration of energy, preferably these are rechargeable energy storage means, in particular lithium-ion batteries or also nickel-metal hydride batteries which are connectable to an allocated compact charging apparatus 49 via a connection 12. Additional connections e.g. for an external antenna 14 or a PC 50 (FIG. 10) are also possible.

Figure 2:
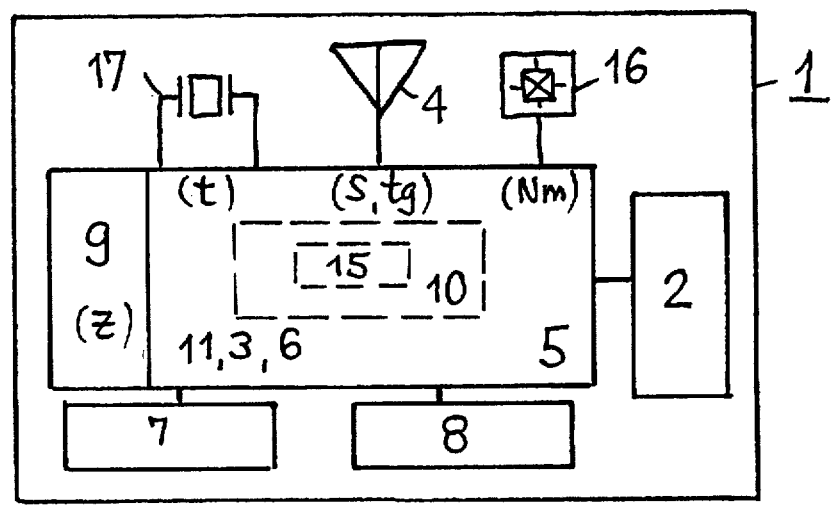

All functions of the watch, i.e. the functions of GPS, compass and time-keeping functions as well as the computations are preferably grouped together in a highly integrated manner in the evaluation electronics 5, e.g. in that several functions are integrated into a single chip 15. This is illustrated in FIG. 2, where with the exception of GPS antenna 4, magnetic field sensors 16 and watch crystal 17, all further signal preparation, processing and computational functions are to a large part grouped together on a single chip 15 or in a microprocessor 10 of the evaluation electronics 5.

Figure 3:
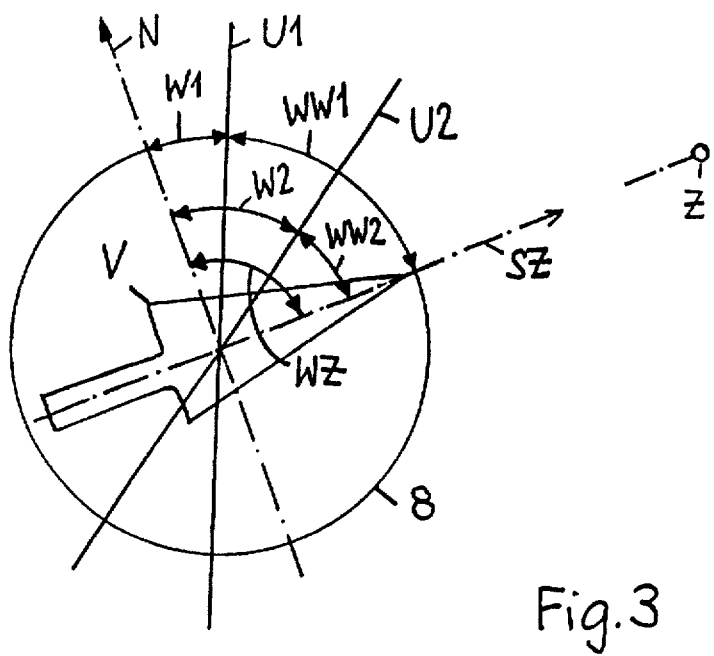
FIG. 3 illustrates the direct display of the destination direction with the vector V, FIG. 4 the chronological sequence of the coordinate and direction determination, FIG. 5 examples of various display information on the same display element, FIG. 6. shows a pocket watch with an extendible antenna, FIG. 7 a pocket watch with an antenna in a hinged lid, FIG. 8 a wrist watch with an annular-shaped antenna on the Match glass, FIG. 9 a hinged wrist watch with an antenna in the strap and with a display on both sides.

FIG. 3 illustrates the evaluation and display of the direction to a desired location Z by way of a vector pointer V.

First of all by way of GPS, the position coordinates at the location S are determined and the geographical direction SZ to the destination Z at an angle WZ to the north direction N is calculated and stored. Thereupon, the momentary alignment of the watch with regard to the geographical north direction is determined by way of a compass, i.e. the position of the watch axis U1 and the angle W1 between the watch axis U1 and the north direction N, and the angle WW1=WZ−W1 is calculated and correspondingly the direction SZ is indicated on the display 8 by way of vector V. If the watch is then turned, e.g. into the position U2, then this is automatically compensated over a certain time (e.g. also selectable), so that the vector V always points in the same direction to the destination Z. For this, in the position U2, the angle W2 is determined and the vector at the angle WW2=WZ−W2 is made viewable on the display. With these measured and stored GPS location coordinates, further desired destination directions may also be very speedily evaluated and displayed without the GPS position finding having to be effected again. Therefore not only is time saved but also energy of the memory 2.

Figure 4:
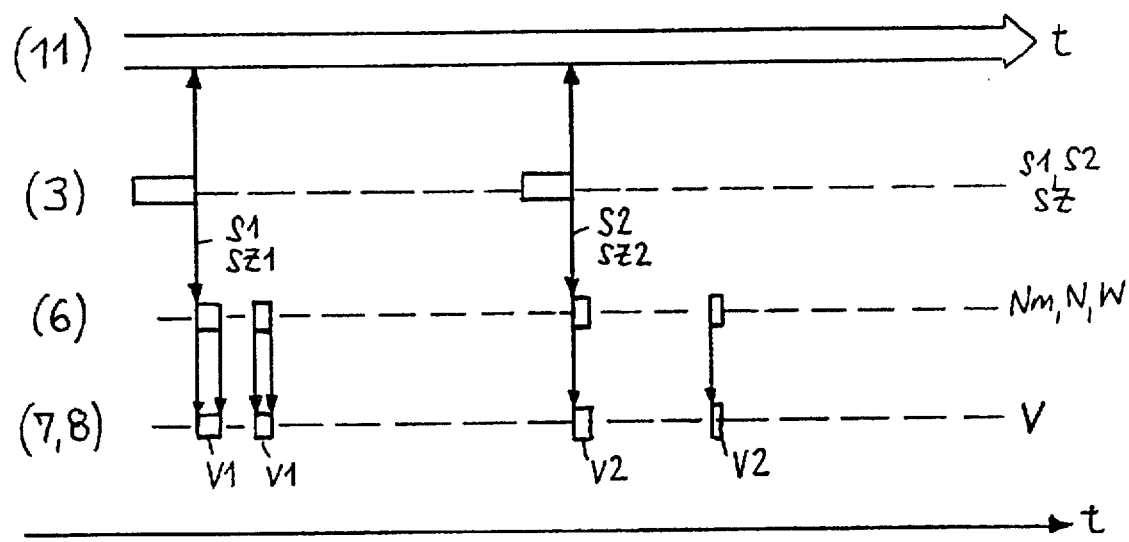

This can also be deduced from FIG. 4. This shows the chronological progress of the various functions. The time-keeping functions (11) run continuously as is required. The most complicated function, the GPS coordinate determination (3), is only activated when a new determination of location (S1, S2) is required. Until then the previous location data may also be used. The relatively short compass measurement (6) as well as the calculation and display of the destination directions SZ are only then activated, when and as long as is required (7, 8). The vector displays V1 here correspond to the location Si and the vector displays V2 to the location S2.

FIGS. 5a to d illustrate further vector and orientation displays as well as time-keeping functions which here can be requested via menu control and are made viewable on the same element display 8 as the orientation display 8b, as well also the time display 8a, e.g. by way of an LCD display apparatus.

Figure 5A:
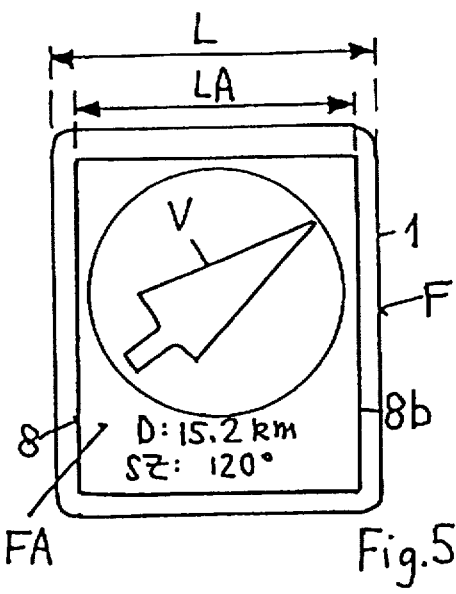
Figure 5B:
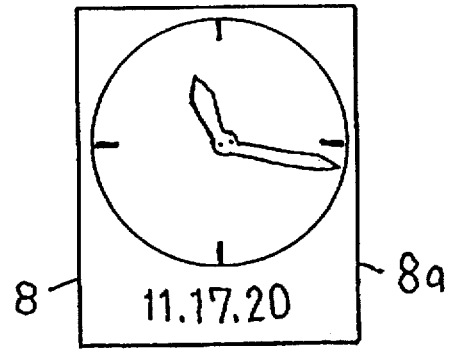
Figure 5C:
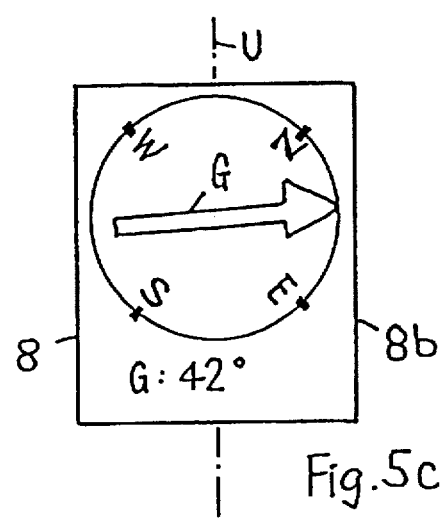
Figure 5D:
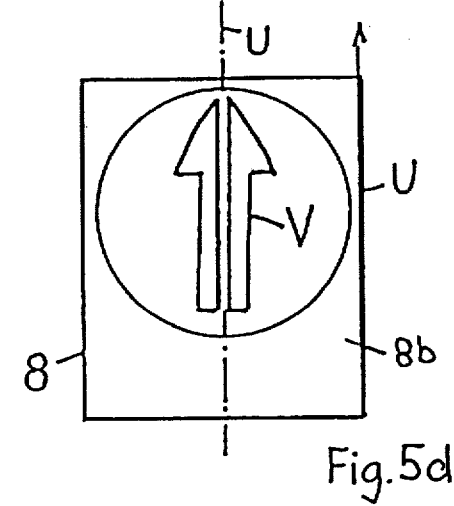

FIG. 5a shows a vector display V to the destination with distance information D and direction information SZ. FIG. 5b shows time-keeping functions with quasi-analog watch hands and digital time information. FIG. 5c shows a display of a selectable desired location, here of G=42° in the dial. FIG. 5d shows the bearing of an evaluated destination direction V parallel to the watch axis U. By way of a bearing edge U of the watch, bearings may also be carried out (taking bearings of the destination and by way of pressing a button, holding the bearing angle).

The invention lies mainly in:
 the combination of the elements: chronograph, GPS and thus precision time derivation, compass and from this the calculation of destination direction as well as a direct vector display in an analog form,
 omitting unnecessary accuracies and functions,
 miniaturizing individual components,
 the combination and grouping together of several functions in the electronic circuit,
 optimized operation and minimum energy consumption.

Figure 6A:
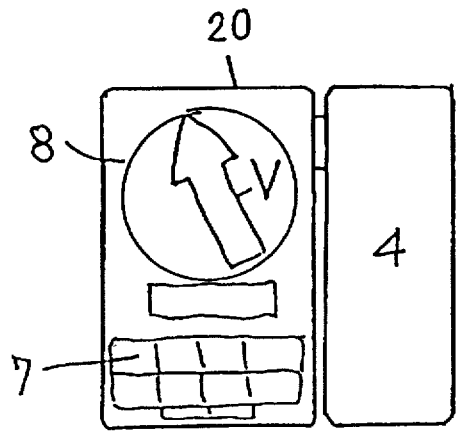
Figure 6B:
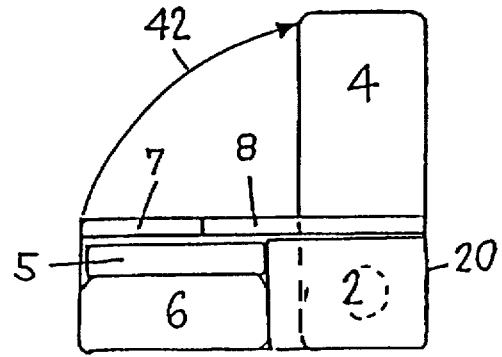
Figure 7:
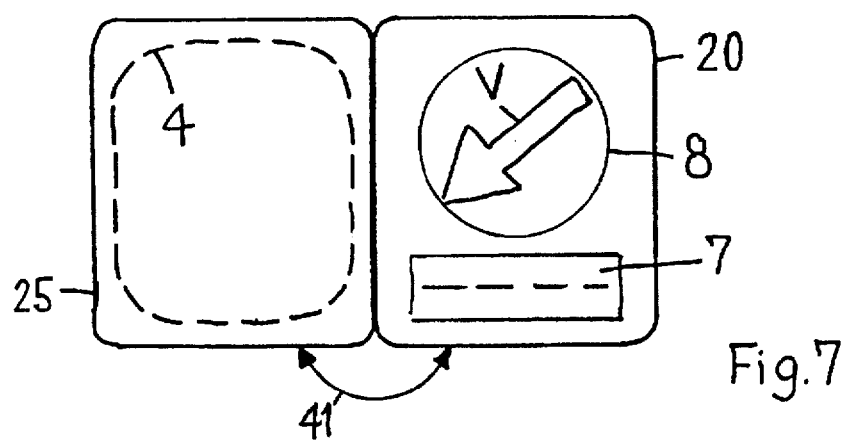
Figure 8:
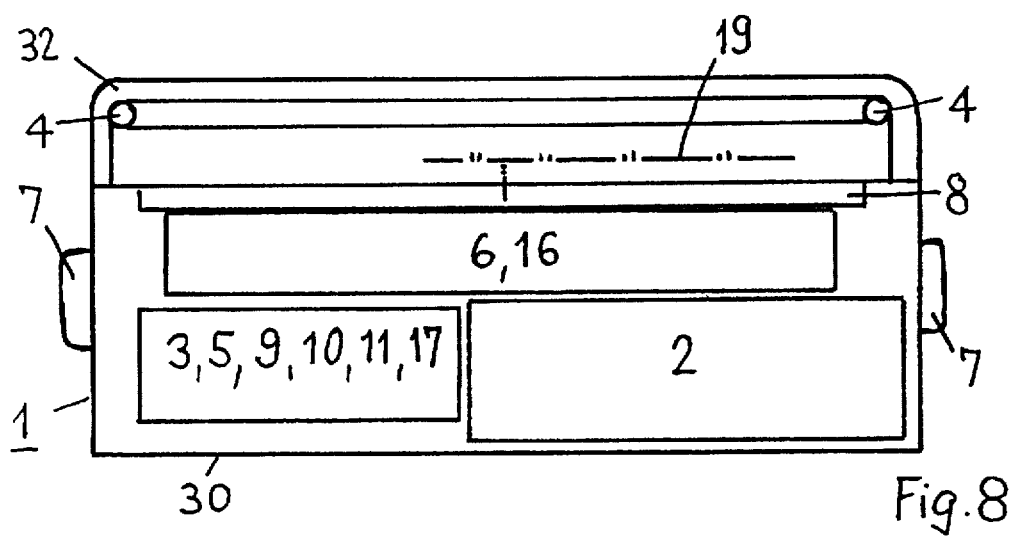

Only so does it become possible to realize these functions with very compact dimensions of a watch which can always be personally carried about, in particular of a pocket watch or a wrist watch with a weight for example of less than 100 g. The embodiment examples illustrate the various possibilities of realizing the extremely compact construction of the precision watch, which despite this contains a relatively large and clearly viewable vector display. Known, relatively large navigational apparatus on the other hand are not always carried about. FIG. 6a, b shows two views, from above and from the side, of a pocket watch with dimensions of e.g. 5×5×2 cm. The GPS antenna 4 should at the same time comprise a largely semi-spherical-shaped antenna pattern which for example is achieved with helix antennae according to FIG. 6 or with horizontally held, flat antennae as is shown in the examples of FIG. 7 and 8. Since here generally no high accuracies are required, the antenna may accordingly be designed more compactly and simply, in that for example less satellites need be acquired than with a higher demand of accuracy and mostly only a two-dimensional coordinate determination (x, y) is sufficient. FIG. 6a shows a helix antenna 4 in the folded together condition in which the precision watch is easy to transport. In FIG. 6b the antenna is extended (42) for receiving. The arrangement of the energy storage means 2, the compass 6, the evaluation electronics 5, the display element 8 and the operating element 7 is shown here as an example.

The example of FIG. 7 shows a different compact pocket watch 20 with an antenna 4, having a flat design, formed as a lid 25 which can be folded out. Thus, in operation, in the folded-out condition 41, there is in principle two surfaces of the watch which are available: left the antenna surface 4 and right the display and input surface 8, 7.

FIG. 8 illustrates a wrist watch 30 according to the invention with an annular antenna 4 on the watch glass 32, with a flat LCD display 8 and a compass 6 lying there below. Here the input elements 7 are formed by buttons and rotating dials known in watch technology. Alternatively to a digital LCD display, the direction display with the vector V could also be designed as an analog pointer 19. In order to make even better use of the very tight spatial conditions in a wrist watch, the antenna may be partly or also completely integrated into the watch strap 31.

Figures 9A, 9B:
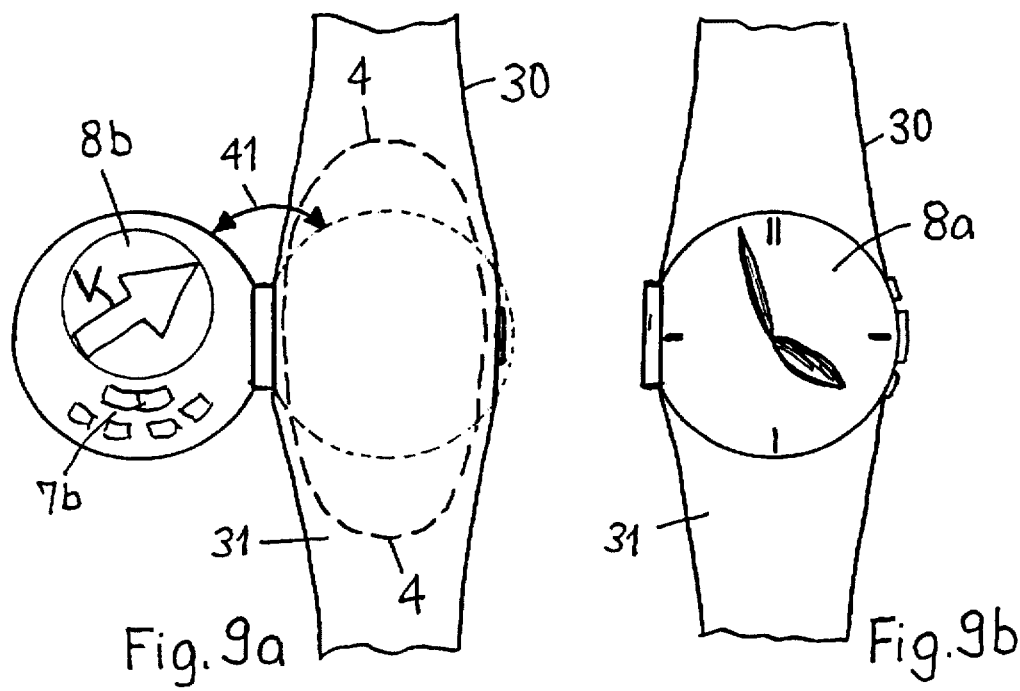

FIGS. 9a, b show such an example with a particularly good use of space. With this wrist watch 30, the watch is collapsibly (41) attached on the watch strap 31, wherein in the normal folded-in position, fixed for example by way of a snap connection, according to FIG. 9b, the display of the time-keeping functions is mounted on the upper flat side. In the folded-out position of FIG. 9a, on the oppositely lying flat side which is now viewable, the orientation display 8b with the operating elements 7b is mounted, whilst the antenna 4, connected to the watch via the hinge of rotation, is integrated in the watch strap 31. With this "double face" design then, the relatively limited surface area of the wrist watch is principally used threefold: for the GPS antenna, for the time functions and for the orientation functions.

Figure 13:
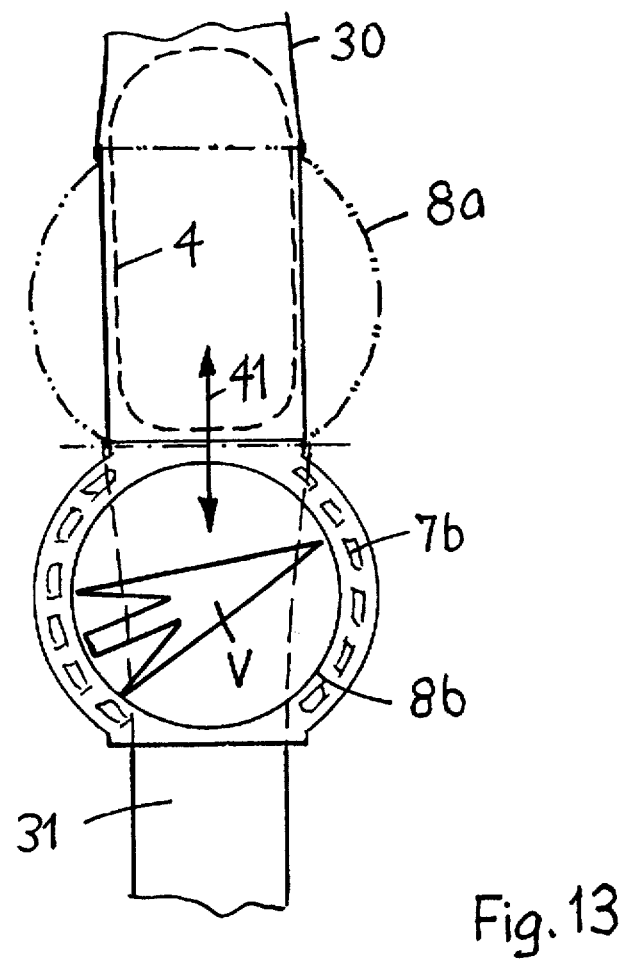
FIG. 13 a further example with a display on both sides.

FIG. 13 shows a further example of a "double face" wrist watch 30 which, different from that of FIG. 9a, b, is formed collapsible in the longitudinal direction (41) to the watch strap 31. Fixed in the normal position 8a, on the viewable upper side, the time-keeping functions are displayed, whereas in the folded-out position 8b shown, the lower side with the orientation display becomes viewable. Here the antenna 4 may also be integrated in the watch strap 31.

Figure 10:
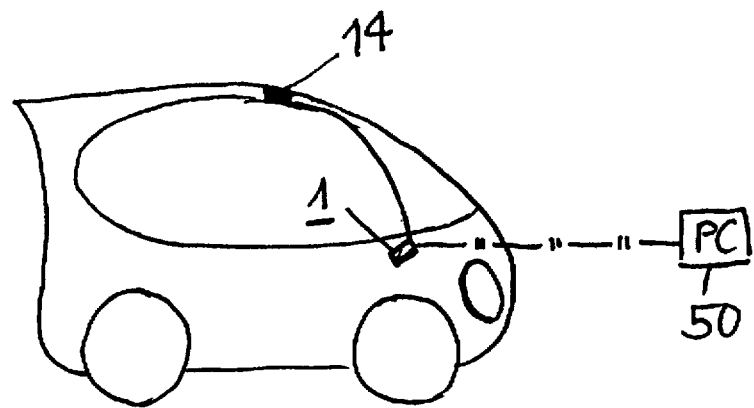
FIG. 10 examples of external connections and antenna.

FIG. 10 illustrates possible additional functions which may be added to the precision watch. For example, as an alternative to the integrated antenna 4, there may be connected an additional antenna 14 which may be rigidly incorporated at a suitable location into a vehicle, e.g. a private motor car or into a boat. The possibility of connection to a computer 50 is also shown here as a variation. With this, for example touring plans may be carried out and inputted, or geographical data recorded by the precision watch may later be evaluated on the PC (see also FIG. 1).

Figure 11:
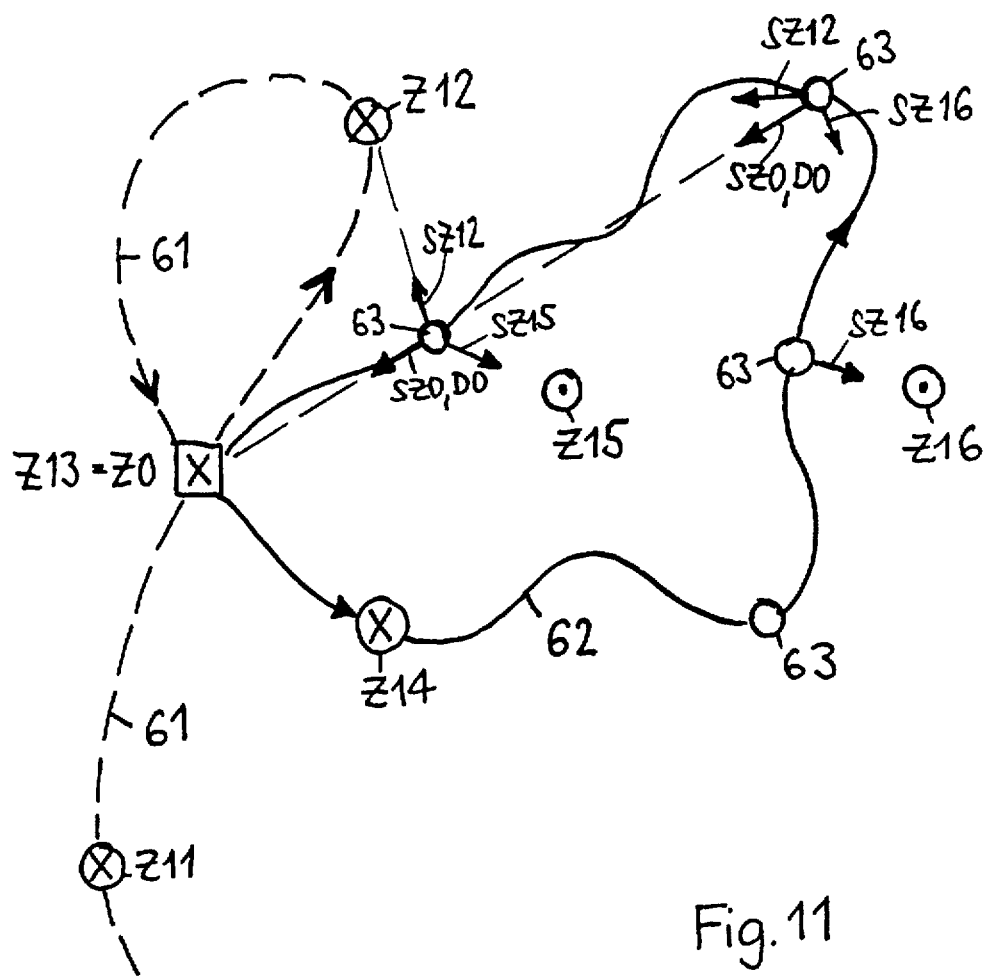
FIG. 11 illustrates an application example on an excursion.

FIG. 11 illustrates as an application example, the use of the precision watch with orientation functions, according to the invention, on an excursion, for example on a long walk or bicycle ride after a journey in the vehicle on route 61, wherein on the way at certain places, automatically recorded by pushing a button, the destinations Z11, Z12, Z13 are evaluated and stored. At the position Z13 the vehicle is parked and this position is fixed as the main destination Z0 and designated. If desired, additionally further destinations, e.g. Z15 and Z16 may be fed in by inputting their geographical coordinates. On the long walk along the route 62 at the position Z14, the coordinates also of this are fixed as the destination. Further along the way, in each case at different positions 63 orientation determination may be carried out as desired. At the same time, in each case not only can the direction ZS0 and the distance D0 to the main destination Z0 be evaluated, but also directions and distances to other destination points Z in order, by way of this, to be able to gain a more complete picture of the situation and of course also to be able to find the vehicle again at the place of parking Z0.

Such momentary destinations Z0, Z11 to Z16, which are only of current interest for a given time, e.g. during an excursion, or also certain destinations only of current interest during a few vacational days or weeks, may be stored in the memory and also deleted again and be replaced by new up-to-date destinations. In addition permanent destinations too which are valid for a long time, e.g. own place of residence, a weekend house or holiday house or an outside accommodation, which is searched time and time again, can also be recorded.

Figure 12:
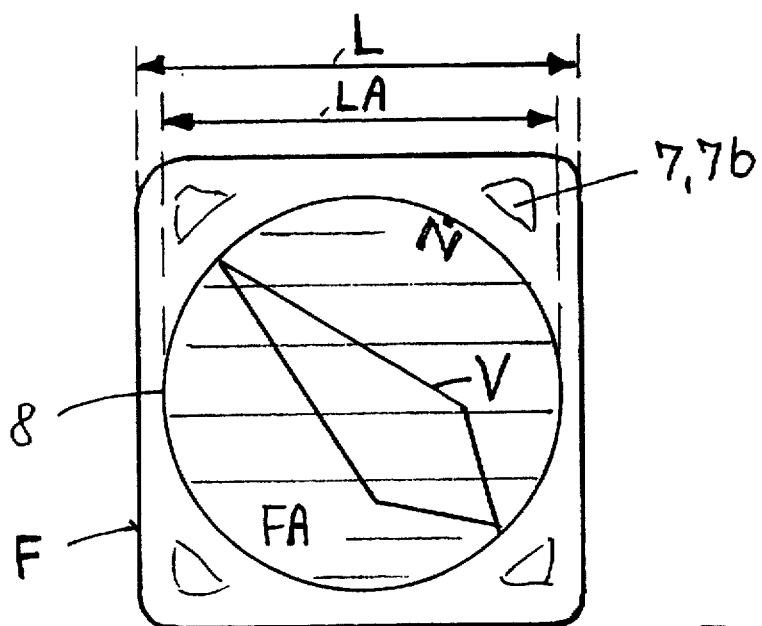
FIG. 12 the large display surface with regard to the whole watch surface area.

FIG. 12 illustrates that the larger part of the whole watch surface area F is devoted to the display surface FA with the vector display V of the display element 8, so that even with the limited dimensions of a wrist watch or pocket watch, a well viewable orientation display is still possible. The proportion of the display surface FA with regard to the watch surface area F lies above 50%, preferably e.g. between 70 and 80% or more. With regard to the linear dimensions or the diameter L of the watch, the diameter LA of the display field should be at least 70%, preferably 80–90% or even more. This large surfaced design of the display surface FA is also illustrated in FIG. 5a.

Also destinations which have a permanent general importance may be recorded, e.g. for Muslims Mecca as the destination, since for devout Muslims it is very important for prayer, always to be able to face Mecca. With the precision watch according to the invention it is then for the first time possible at any time and anywhere, to have the direction to the destination Mecca appear by way of the display arrow at the touch of a button, when this destination has been programmed.

In everyday life too there often arises the situation when one wishes to have the direction to a required destination indicated, e.g. in order to find one's way back to meeting places at large trade fairs or exhibitions, or in order to be able to find one's car in a car park, or a hotel in unknown towns and districts, in particular when night has already fallen. This not only concerns people with a weak sense of orientation, it would also be conceivable to be able to help children, who so often get lost, back on the right way home with the destination display according to the invention.

What is claimed is:

1. A portable precision watch with time-keeping functions, additional functions and energy storage means, wherein the watch also contains a GPS receiver with an antenna and evaluation electronics, a compass for determining the magnetic north-south direction, a memory for storing destination coordinates, an input element for inputting selectable destination coordinates, and a display element for displaying the direction from a location to a destination, wherein with the evaluation electronics, the coordinates of the location are determined and from the coordinates of the location and the coordinates of the destination, the direction to the destination is calculated, wherein by way of the compass the alignment of the watch to the geographical north-south direction is determined and taking account of this alignment of the watch, the direction to the destination is made viewable as a vector display in the display element, wherein all elements are grouped together as a compact functional unit and the computation of the data is effected in a microprocessor and wherein the watch time can be controlled by the received GPS time.

2. A precision watch according to claim 1, wherein in the evaluation electronics, several functions of GPS, compass, and watch, as well as their computations are grouped together on a chip.

3. A precision watch according to claim 1, wherein the watch may also be applied as a bearing compass and wherein any geographical direction which can be inputted is displayable.

4. A precision watch according to claim 1, wherein the compass is designed as an electronic sensor compass without mechanically moving parts.

5. A precision watch according to claim 1, wherein additionally the distance to the destination is calculated and displayed.

6. A precision watch according to claim 1, wherein firstly the coordinates of the location and then the direction to the destination are calculated and with these fixed values subsequently during a certain time, the vector display is continuously followed up, corresponding to the alignment of the watch.

7. A precision watch according to claim 1, wherein the direction to the destination is displayed in an analog manner with a pointer or in a quasi-analog manner on a display in vector form.

8. A precision watch according to claim 1, wherein the input of destinations is inputted by way of numerical input of the coordinates and/or by automatic computation and storage of the position coordinates as the destination.

9. A precision watch according to claim 1, wherein the input and/or display types can be selected via menu control and the input and display elements can be illuminated.

10. A precision watch according to claim 1, wherein the display element comprises a matrix display, in particular as an LCD display.

11. A precision watch according to claim 1, wherein the input and operating element are designed as a touch screen.

12. A precision watch according to claim 1, wherein at least one of the elements—antenna, display element or operating element is formed so that it can be folded out or extended.

13. A precision watch according to claim 1, wherein the watch is designed as a compact, personally portable pocket watch.

14. A precision watch according to claim 1, wherein the watch is designed as a wrist watch.

15. A precision watch according to claim 14, wherein the antenna is at least partly integrated in a watch strap.

16. A precision watch according to claim 14, wherein the watch is collapsibly fastened on the strap and wherein the watch on one flat side comprises a time-keeping display and on the oppositely lying flat side comprises an orientation display.

17. A precision watch according to claim 1, wherein the display alternatively displays time functions and orientation functions.

18. A precision watch according to claim 1, wherein rechargeable energy storage means of very high energy concentration, in particular a Li-Ion battery is provided, with a connection for an allocated compact charging apparatus.

19. A precision watch according to claim 1, wherein a connection for an additional antenna and/or a connection for an external computer is provided.

20. A precision watch according to claim 1, wherein Mecca is permanently programmed in as a destination.

21. A precision watch according to claim 1, wherein the display area with the vector display is at least half of the watch surface area.

22. A precision watch according to claim 1, wherein the diameter of the display surface is at least 70% of the watch diameter.

* * * * *